(12) United States Patent
Singleton

(10) Patent No.: US 9,832,620 B1
(45) Date of Patent: *Nov. 28, 2017

(54) SYSTEM FOR RECEIVING AND PROCESSING MULTIMEDIA MESSAGES SENT TO A MOBILE DEVICE AND METHOD THEREOF

(71) Applicant: West Corporation, Omaha, NE (US)

(72) Inventor: Larry Clement Edward Singleton, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/988,479

(22) Filed: Jan. 5, 2016

(51) Int. Cl.
*H04W 4/12* (2009.01)
*H04L 29/06* (2006.01)

(52) U.S. Cl.
CPC ............... *H04W 4/12* (2013.01); *H04L 63/04* (2013.01)

(58) Field of Classification Search
CPC ...................................................... H04W 4/12
See application file for complete search history.

(56) References Cited

U.S. PATENT DOCUMENTS

2007/0203982 A1* 8/2007 Jagoe .................. H04L 12/1818
709/204

* cited by examiner

*Primary Examiner* — Michael T Vu
(74) *Attorney, Agent, or Firm* — Raffi Gostanian

(57) ABSTRACT

A system for providing multimedia messages to a mobile device and a method thereof. The system includes a portal server, such as an integrated web portal server, structured to receive and direct processing of a multimedia message. The system may also include a Short Message System (SMS) server acting as an interface between the portal server and the mobile device. The SMS server may forward an SMS message to the mobile device indicating that the multimedia message has been received for the mobile device. Other features of the system may include an Automatic Speech Recognition (ASR) server for converting the multimedia message to a text message, a media server to store the multimedia message for retrieval by the mobile device, and a billing server structured to determine an amount to bill for processing of the multimedia message.

20 Claims, 4 Drawing Sheets

SYSTEM FOR RECEIVING AND PROCESSING MULTIMEDIA MESSAGES SENT TO A MOBILE DEVICE AND METHOD THEREOF

CROSS-REFERENCE TO RELATED APPLICATIONS

This application is a continuation from U.S. patent application Ser. No. 12/107,168, filed Apr. 22, 2008, entitled SYSTEM FOR RECEIVING AND PROCESSING MULTIMEDIA MESSAGES SENT TO A MOBILE DEVICE AND METHOD THEREOF, the entire contents of which is incorporated by reference herein in its entirety.

FIELD OF THE INVENTION

The present invention relates to multimedia messaging in a mobile environment. More particularly, and not by way of limitation, the present invention is directed to a system and method for receiving and processing multimedia messages sent to a mobile device and method thereof.

In the art, there exists a Multimedia Messaging Service (MMS) that is fully specified by standards organizations, including 3GPP, 3GPP2, and the Open Mobile Alliance (OMA). MMS is an evolution of the Short Message Service (SMS) and is designed to send and receive multimedia messages such as graphics or pictures, video, audio, etc. However, implementation of the MMS is a slow process due to factors such as providing universal mobile device support and universal network interoperability. It is estimated that it will take several years before MMS technology is ubiquitous.

As an alternative to MMS, and primarily implemented at the time in Asian countries, Voice SMS is an emerging technology and is based on technology similar to that of SMS text messaging. In Voice SMS, a user records a voice message with a service, and an SMS text message is sent by the service to an intended recipient of the recorded message indicating that they have received a Voice SMS from the user. The notification to the intended recipient may also include a phone number to call in which to retrieve the voice message.

Since SMS text messaging is provided for most mobile devices, there are no mobile device configuration or interoperability problems with Voice SMS as are associated with MMS.

However, it may be desirable to store the multimedia messages for a period of time for access by the mobile device, or determine an amount to bill for processing and/or storing of the multimedia messages. Further, it may be desirable to provide added value to the message, such as providing targeted advertising along with the voice message when the voice message is retrieved. To do this, an architectural platform which provides a global service with integrated SMS alerts would be beneficial.

Also, there may be instances where it is desirable to convert the multimedia message, for example, using a speech-to-text conversion program, and provide the contents of the multimedia message to the recipient in a text message format. This latter example may be useful for situations such as when the system determines that the intended recipient may be deaf, or when the intended recipient indicates to the system that they are in an environment where retrieving voice messages is not possible, such as in a meeting.

Further, it may be desirable in situations when a text message is being sent from a user to a recipient for the text message to be converted to a voice message, for example, when the system determines that the intended recipient may have sight problems.

BRIEF SUMMARY OF THE INVENTION

The present invention, in exemplary embodiments, overcomes the above disadvantages and other disadvantages not described above. Also, the present invention is not required to overcome the disadvantages described above, and an exemplary embodiment of the present invention may not overcome any of the problems described above.

Thus, in one aspect, the present invention is directed to a system that may include a portal server, such as an integrated web portal server, structured to receive and direct processing of a multimedia message. The system may also include a Short Message Service (SMS) server acting as an interface between the portal server and the mobile device. The SMS server may forward an SMS message, for example, Voice SMS or Video SMS, to the mobile device indicating that the multimedia message has been received for the mobile device. Other features of the system may include an Automatic Speech Recognition (ASR) server for converting the multimedia message to a text message, a media server to store the multimedia message for retrieval by the mobile device, and a billing server structured to determine an amount to bill for processing of the multimedia message.

In another aspect, the present invention is directed to a method for providing multimedia messages to a mobile device. In this aspect, the method may comprise receiving a multimedia message at a portal server; processing the multimedia message according to predetermined criteria; and sending a notification to the mobile device that the multimedia message has been received for the mobile device.

In yet another aspect, the present invention is directed to a computer-readable medium comprising instructions for: receiving a multimedia message at a portal server; processing the multimedia message according to predetermined criteria; and sending a notification to the mobile device that the multimedia message has been received for the mobile device.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

Reference will now be made in detail to exemplary embodiments of the present invention, examples of which are illustrated in the accompanying drawings.

Figure 1:
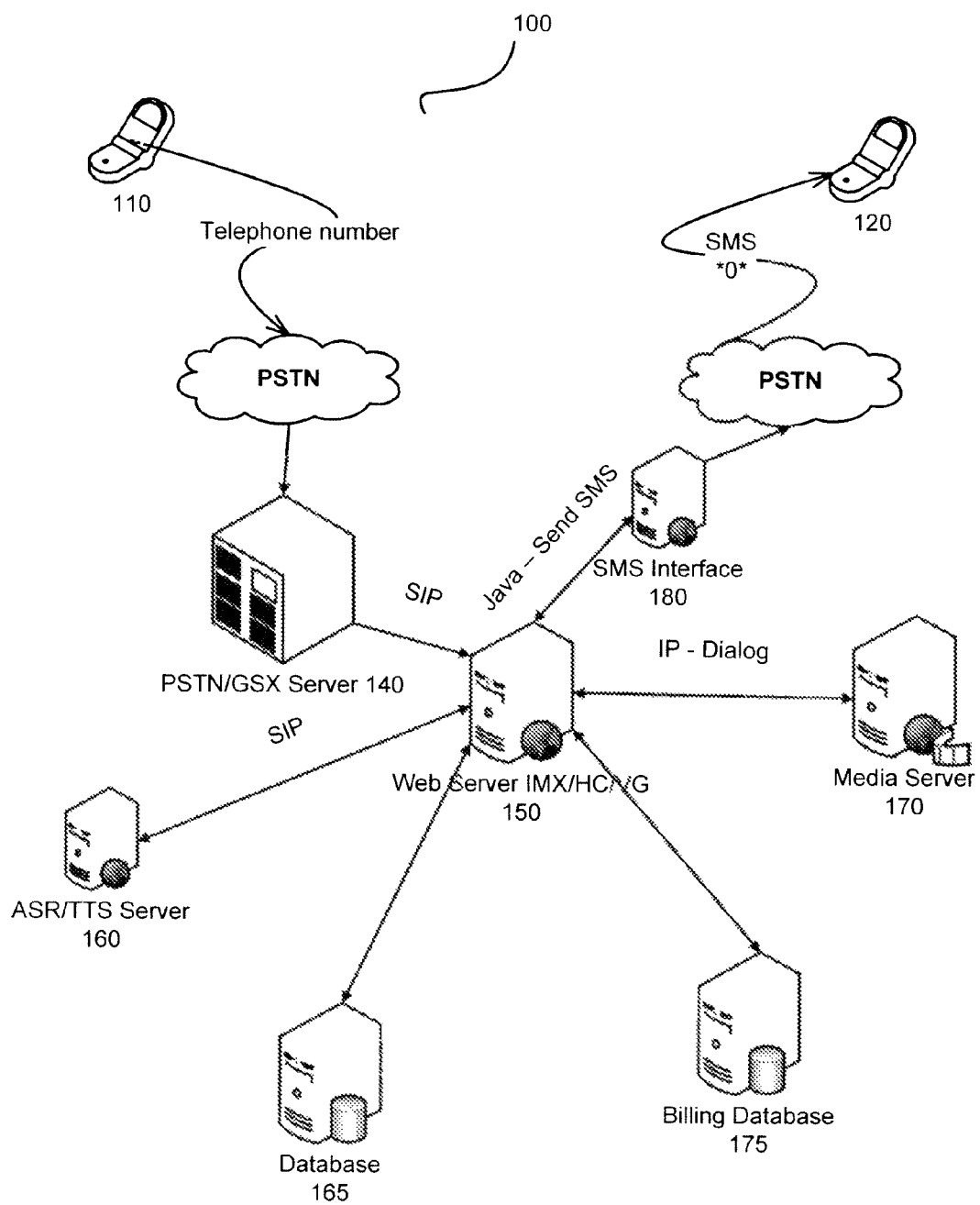
FIG. 1 illustrates a system for receiving and processing multimedia messages sent to a mobile device according to an exemplary embodiment of the invention.

FIG. 1 illustrates a system 100 for receiving and processing multimedia messages sent to a mobile device according to an exemplary embodiment of the invention. Note that in the present invention, multimedia messages may include graphics or pictures, video, audio, and Voice SMS, as well as Video SMS. In FIG. 1, to initiate sending a multimedia message from a user of a mobile device 110 to a recipient user of a mobile device 120, the user of the mobile device 110 may dial a phone number or indicate a network address for which to contact the recipient user of the mobile device 120. Note that the mobile devices 110/120 are not limited to cellular devices as shown in FIG. 1, but may include PDA devices, instant messaging devices, email devices, pagers, or even personal computers. Further, a server 150 of the invention may even be configured in exemplary embodiments of the invention to be used with fixed or stationary devices operable to communicate with one another.

Accordingly, the user of the mobile device 110 sends a multimedia message, such as a telephone call through the public switched telephone network (PSTN) which may be routed to an interface of the PSTN, such as a Private Branch eXchange (PBX) server 140 of the system 100. For example, calls may be routed such as *npa-nxx-xxxx and *0* to server 140 for processing.

The PSTN/GSX server 140 may then route the telephone call to the integrated web portal IMX/HC/VG server 150.

The server 150 may be structured to receive, process, and provide access to multimedia messages, such as the recorded voice message, to the recipient user of the mobile device 120. For processing the multimedia messages, the server 150 may, for example, draw information from a database 165 that includes mobile device characteristics, such as network, architecture, or platform characteristics based on the telephone number or web address of known mobile devices and use these characteristics to format the multimedia message to a format compatible with the mobile device 120. This may facilitate sending multimedia messages between different networks, or when there are interoperability differences among the mobile devices.

The server 150 may also direct that the multimedia message be saved in storage, such as in media server 170 for future retrieval by the recipient mobile device 120. Further, the server 150 may direct that advertising messages or other information messages (for example, company contact information, weather, etc.) be appended to multimedia message so that a user retrieving the message may receive targeted advertising or other information. Also, the server 150 may direct billing database 175 to calculate a billing amount associated with receiving and processing the multimedia message.

Once the message has been received, processed as appropriate, and stored, an SMS message may be sent via an SMS Interface server 180 to the recipient user of the mobile device 120 to notify them that the user of mobile device 110 has sent them a multimedia message. At this point, in exemplary embodiments, the recipient user of the mobile device 120 may choose to listen and/or view the multimedia message (for example, a Voice SMS or a Video SMS) as it is stored by the server 150. In any of the embodiments, a notification sent to the recipient user of the mobile device 120, such as an SMS message, may also include the text conversion of the multimedia message.

In another embodiment, the server 150 may direct a speech-to-text conversion of the multimedia message via ASR/TTS server 160 and forward the text message to the mobile device 120. Alternatively, in situations where there is a text message sent from the mobile device 110, the server 150 may direct converting the text message into speech and voice mail and forward the voice mail to the mobile device 120.

Figure 2:
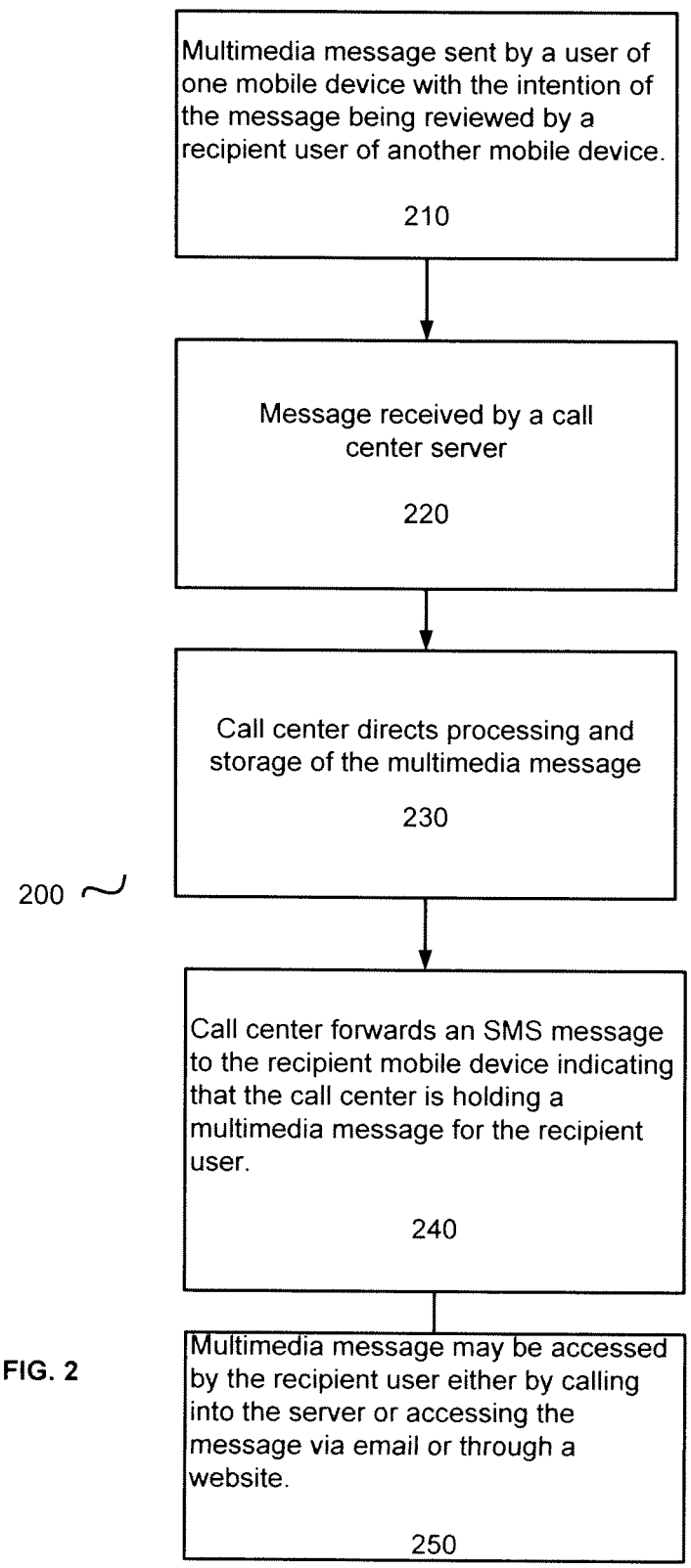
FIG. 2 is a flowchart illustrating a method for receiving and processing multimedia messages sent to a mobile device according to an exemplary embodiment of the invention.

FIG. 2 is a flowchart illustrating a method 200 for receiving and processing multimedia messages sent to a mobile device according to an exemplary embodiment of the invention. As shown in FIG. 2, in step 210, a multimedia message is sent by a user of one mobile device with the intention of its being reviewed by a recipient user of another mobile device.

In step 220, the message is received by a call center server.

Next, in step 230, the call center server directs processing and storage of the multimedia message. As noted above, the processing of the multimedia message may include adding advertising messages or other information messages (for example, company contact information, weather, etc.) to the multimedia message so that a user retrieving the multimedia message may receive targeted advertising or other information.

In step 240, an SMS message is sent to the recipient user of the mobile device indicating that the call center is holding a multimedia message for the recipient user.

Finally, in step 250, the multimedia message may be accessed by the recipient user either by calling into the server 150 or even, for example, accessing the message via email or through a website.

Figure 3:
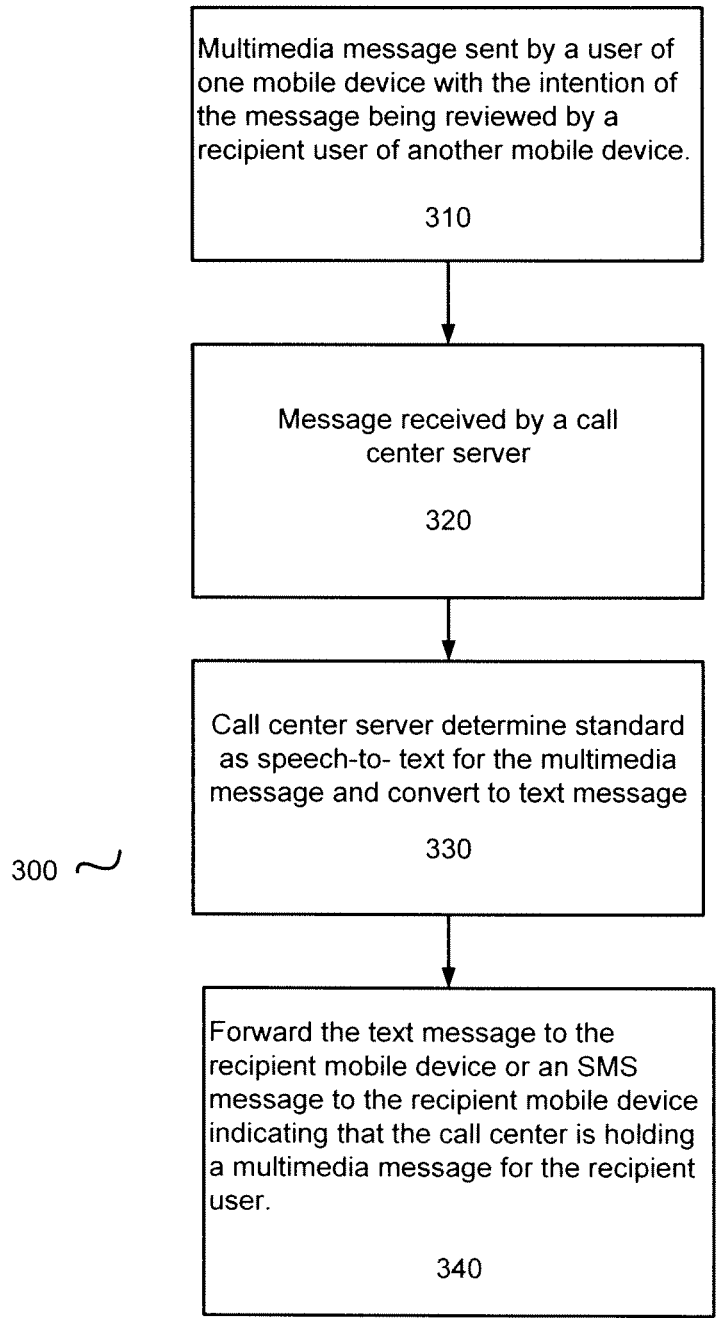
FIG. 3 is a flowchart illustrating another method for receiving and processing multimedia messages sent to a mobile device according to an exemplary embodiment of the invention.

FIG. 3 is a flowchart illustrating another method 300 for receiving and processing multimedia messages sent to a mobile device according to an exemplary embodiment of the invention. As shown in FIG. 3, in step 310, a multimedia message is sent by a user of one mobile device with the intention of its being reviewed by a recipient user of another mobile device.

In step 320, the message is received by a call center server.

Next, in step 330, the call center server determines whether there is a standard operable with the recipient mobile device into which to format the multimedia message received at a data center. When the standard is that the multimedia message should be converted to a text message, the call center may convert the multimedia message to a text message, and in step 340, alert the recipient mobile device of the text message. In an exemplary method, based on the length of the text message, the text message may be sent as an SMS message. Alternatively, for longer messages, the call center may choose to forward the text message via email to the recipient user.

Figure 4:
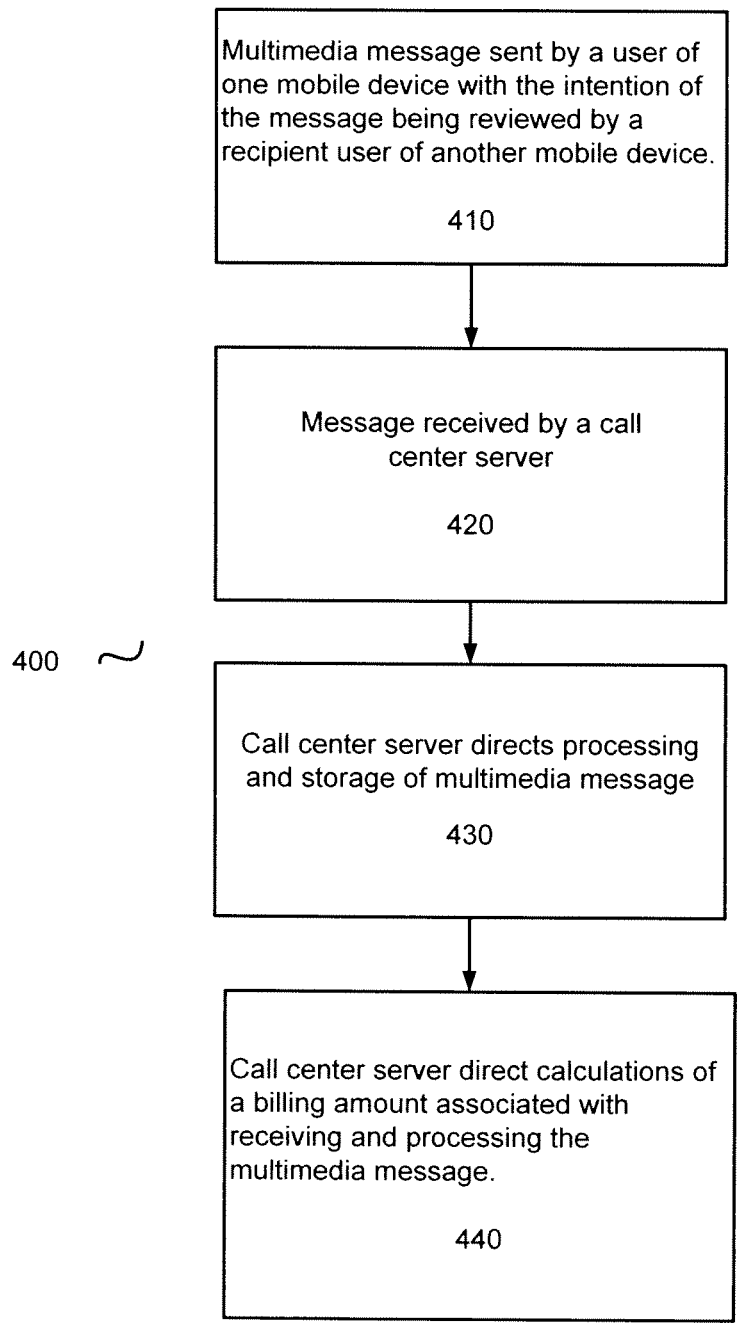
FIG. 4 is a flowchart illustrating yet another method for sending and receiving multimedia messages sent to a mobile device according to an exemplary embodiment of the invention.

FIG. 4 is a flowchart illustrating yet another method 400 for providing multimedia messages to a mobile device according to an exemplary embodiment of the invention. As shown in FIG. 4, in step 410, a text message is sent by a user of one mobile device with the intention of its being reviewed by a recipient user of another mobile device.

In step 420, the message is received by a call center server.

Next, in step 430, the call center server directs processing and storage of the multimedia message and also directs notification via SMS message that a multimedia message has been received for the mobile device.

Concurrently with this, the call center server may also, in step 440 direct calculations of a billing amount associated with receiving and processing the multimedia message. Also, the call center may append advertising to the multimedia message. In this case, a user may choose to listen to the advertisement to offset costs of the amount billed for using the messaging system.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A system, comprising:
   a portal server configured to receive a multimedia message and store the multimedia message in a media server for future retrieval by a mobile device; and
   a short message service (SMS) server interfaced between the portal server and the mobile device, the SMS server configured to transmit a SMS message to the mobile device notifying the mobile device that the multimedia message has been received for retrieval;
   wherein the portal server is further configured to receive a response from the mobile device after the mobile device receives the SMS message, and, based on the response, direct access to the multimedia message for retrieval.

2. The system according to claim 1, further comprising an automatic speech recognition (ASR) server configured to convert the multimedia message to a text message.

3. The system according to claim 1, wherein the media server is configured to store the multimedia message for retrieval by the mobile device.

4. The system according to claim 1, further comprising a billing server configured to determine an amount to bill for at least one of processing and storing the multimedia message.

5. The system of claim 1, wherein the portal server is further configured to append at least one additional message to the multimedia message such that mobile device downloading the multimedia message receives the at least one additional message.

6. A method, comprising:
   receiving a multimedia message at a portal server;
   storing, by the portal server, the multimedia message in a media server for future retrieval by a mobile device; and
   sending, from a short message service (SMS) server, a notification to the mobile device that the multimedia message has been received for retrieval;
   wherein the portal server is further configured to receive a response from the mobile device after the mobile device receives the SMS message, and, based on the response, direct access to the multimedia message for retrieval.

7. The method according to claim 6, wherein the multimedia message comprises a voice message processed into a text message by automatic speech recognition.

8. The method according to claim 7, wherein the notification comprises the text message.

9. The method according to claim 6, wherein the multimedia message comprises a text message processed into a voice message by text-to-speech recognition.

10. The method according to claim 6, wherein the multimedia message comprises at least one of a Voice SMS and a Video SMS.

11. The method according to claim 6, wherein the notification comprises a Short Message Service (SMS) message.

12. The system of claim 6, wherein the multimedia message is stored for a period of time for access by the mobile device.

13. The method according to claim 6, further comprising:
    receiving, by the portal server, a response from the mobile device after the mobile device receives the notification; and
    providing the mobile device with access to the stored multimedia message for retrieval.

14. The method according to claim 6, further comprising determining a billing amount for the multimedia message.

15. A non-transitory computer-readable medium comprising instructions for:
    receiving a multimedia message at a portal server;
    storing the multimedia message in a media server for future retrieval by a mobile device; and
    sending a notification to the mobile device that the multimedia message has been received for retrieval;
    wherein the portal server is further configured to receive a response from the mobile device after the mobile device receives a Short Message Service (SMS) message, and, based on the response, direct access to the multimedia message for retrieval.

16. The non-transitory computer-readable medium according to claim 15, wherein the multimedia message comprises one of a Voice SMS and Video SMS, and the at least one of a Voice SMS and Video SMS is processed into a text message by automatic speech recognition.

17. The non-transitory computer-readable medium according to claim 15, wherein the notification comprises a text conversation of the multimedia message.

18. The non-transitory computer-readable medium according to claim 15, further comprising instructions for receiving a response from the mobile device after the mobile device receives the notification, and providing the mobile device with access the stored multimedia message for retrieval.

19. The non-transitory computer-readable medium according to claim 15, further comprising instructions for determining a billing amount for the multimedia message.

20. The non-transitory computer-readable medium according to claim 15, wherein a predetermined criteria comprises targeted advertising criteria.

* * * * *